UNITED STATES PATENT OFFICE.

JONATHAN SHERMAN, JR., OF CHICAGO, ILLINOIS, ASSIGNOR, BY MESNE ASSIGNMENTS, TO AMERICAN PRESSED TAN BARK COMPANY, OF NEW JERSEY.

PREPARATION OF TAN-BARK FOR TRANSPORTATION.

SPECIFICATION forming part of Reissued Letters Patent No. 10,230, dated October 31, 1882.

Original No. 182,965, dated October 3, 1876. Application for reissue filed October 2, 1882.

DIVISION B.

*To all whom it may concern:*

Be it known that I, JONATHAN SHERMAN, Jr., of Chicago, in the county of Cook and State of Illinois, have invented an Improved Process for Preparing Tanning-Bark for Shipment, of which the following is a specification.

This improvement relates to the preparation of tanning-bark, so as to be ready for tanners' use, and yet will not be bulky or liable to waste by shipping; and it consists in drying, grinding, and compressing the bark into bricks of any desirable shape on or near the spot where it is gathered.

Heretofore the bark was shipped to the tanners in its natural shape as it was scaled off of the oak and hemlock trees, either single or compressed in layers, which, by their irregularity and spongy property, are very bulky for shipment, and quite a percentage had to be allowed for waste in loading and unloading, all which I prevent by drying, grinding, and pressing the bark into suitable cakes of brick or prismatic shapes. Such compressed ground bark the tanner will break into pieces, which, in steeping in water, will swell and easily come apart, and will save to him the trouble of grinding or cutting the same himself, and by the means of such compression the cells of the bark containing the tannin are extended and broken, which admits the water to come more freely in contact with it. Thus the tanner will save a large percentage of the strength of the barks over the ordinary mode of now doing it. This compression also breaks the cells of the gummy or resinous matter contained in the bark, which, being brought into more intimate contact with the fibrous material under pressure, causes the latter to adhere in a compact mass and gives to the cake a smooth, glassy surface.

Having thus described my invention, what I claim as new, and desire to secure by Letters Patent, is—

As a new article of manufacture, compressed tan-bark in which the tannin-cells have been crushed or broken by the compression, whereby the free tannin is readily and entirely yielded up when the compressed cake is soaked out, substantially as described.

JONATHAN SHERMAN, JR.

Witnesses:

JNO. C. MACGREGOR,

J. W. MILLINGTON.